United States Patent [19]

Roberts

[11] Patent Number: 5,801,696
[45] Date of Patent: Sep. 1, 1998

[54] MESSAGE QUEUE FOR GRAPHICAL USER INTERFACE

[75] Inventor: David Roberts, Stockton, United Kingdom

[73] Assignee: International Business Machines Corp.

[21] Appl. No.: 737,037
[22] PCT Filed: Jul. 27, 1995
[86] PCT No.: PCT/GB95/01780
§ 371 Date: Oct. 11, 1997
§ 102(e) Date: Oct. 11, 1997
[87] PCT Pub. No.: WO96/30830
PCT Pub. Date: Oct. 3, 1996

[30] Foreign Application Priority Data

Mar. 25, 1995 [GB] United Kingdom .................. 9506142

[51] Int. Cl.$^6$ ...................................................... G06F 3/00
[52] U.S. Cl. ........................................................ 345/340
[58] Field of Search ................................... 345/340–349

[56] References Cited

U.S. PATENT DOCUMENTS

| | | | |
|---|---|---|---|
| 4,896,290 | 1/1990 | Rhodes et al. | 395/887 |
| 5,455,904 | 10/1995 | Bouchet et al. | 345/346 |
| 5,495,566 | 2/1996 | Kwatinetz | 345/341 |
| 5,524,198 | 6/1996 | Matsumoto et al. | 345/340 |
| 5,533,180 | 7/1996 | Zhou et al. | 345/347 X |

FOREIGN PATENT DOCUMENTS

406060038A 3/1990 Japan .
402118826A 5/1990 Japan .

OTHER PUBLICATIONS

Pietrek, Matt, "Investigating the hybrid windowing and messaging architecture of Chicago," Microsoft Systems J., V9, N9, p. 15(14), ,1994.

(List continued on next page.)

*Primary Examiner*—A. Katbab
*Attorney, Agent, or Firm*—Daniel E. McConnell; George E. Grosser

[57] ABSTRACT

The present invention provides a data processing system arranged to run a plurality of applications, each application being associated with one or more windows, and each window being under the control of a user interface provided by the system. A method of operating such a system is also provided. The system according to the invention comprises: a display device for displaying the windows to a user; an input means for receiving events entered by a user from a plurality of input devices connectable to the system; a storage device for storing the user events received by the input means in queues for subsequent processing by the applications; and a queue control means for creating the queues in the storage device and for directing the user events received by the input means to selected queues in the storage device. The system is characterized in that each input device connected to the input means is categorized as either a pointing device or a non-pointing device, and the queue control means comprises: generation means for creating first and second sets of queues in said storage device, each queue in the first set being associated with a specific one of said windows, and each queue in the second set being associated with a non-pointing device from said plurality of input devices; routing means for directing each event entered via a pointing device to the queue in said first set which is associated with the window identified by that pointing device, and for directing each event entered via a non-pointing device to an open queue in the second set which is associated with that non-pointing device; and transfer means for transferring control of queues in said second set between the various windows as requested by the applications with which said windows are associated. By employing the above approach, the present invention uses a hybrid queue to handle user events in a GUI system. The problems associated with prior art techniques, for example, system lockup, extra user effort, and the inability to provide a 'type ahead' facility, are avoided.

14 Claims, 5 Drawing Sheets

OTHER PUBLICATIONS

Prosise, Jeff, "What's in a thread?" PC Magazine, V14, N21, p. 379(3), 1995.

Ruley, John, "NT and OS/2 Go Head–to–Head," Windows MAgazine, N501, P262, 1994.

Petzold, Charles, "Windows and Multitaskin," PC Magazine, V12, N13, p. 399(4), 1993.

Petzold, Charles, "Why you need to multitask in OS/2 presentation Manager?" PC Magazine, V9, N9, p. 293(4), 1990.

IBM: "OS/2 2.0 Presentation Manager Programming Guide," Mar. 1992, QUE, USA.

Grehan, Rick, "In Any Event," BYTE, May 1990, pp. 311–322.

MESSAGE QUEUE FOR GRAPHICAL USER INTERFACE

The present invention relates to data processing systems that are arranged to run a plurality of applications, each application being associated with one or more windows.

In such systems the windows are under the control of user interface software which is, amongst other things, responsible for controlling the output shown to the user on a display device of the system. The user interface software may be a separate entity from the operating system installed on the data processing systems (eg as in Microsoft Corporation's Windows product which runs on a DOS operating system), or can be included as part of the operating system itself (eg as in IBM Corporation's OS/2 operating system). For the purposes of the present invention it does not matter which type of user interface software is being used, and both of the above types will be referred to hereafter as graphical user interfaces (GUIs).

Today's GUIs generally exhibit a problem in handling user interface events. Most GUI systems take input events from devices such as the keyboard or mouse and place them on a queue. Some systems, eg IBM OS/2, Microsoft Windows, place all user events onto a single queue for the whole system; these systems will hereinafter be referred to as 'synchronous' event handling systems. The manner in which such a synchronous event handling system handles messages is illustrated in FIG. 1. In the system shown, three applications are being used, namely applications A, B and C (items 10, 20, 30 respectively). Application A has three windows associated with it, Application B has one, and Application C has two windows. The user of the system will interact with the applications 10, 20, 30 by using input devices such as a keyboard or a mouse to direct input to the various windows being displayed on the display device of the system.

As events from the various input devices are received by the system, they are placed on a queue 40 which operates in a first-in-first-out (FIFO) manner. A piece of software, which shall be referred to herein as a dispatcher 50, then reads an event from the queue 40, determines which application the event is directed to, and dispatches the event to that application for processing. Once the application has processed the event, it informs the dispatcher 50, and the dispatcher then repeats the process of reading the next event from the queue 40, and sending it to the application that is perceived as being the application to which the event was directed by the user.

The dispatcher 50 has access to data giving information about the current location on the display device of the various windows of each application. Hence, if a particular event is from a pointing device such as a mouse, the positional information contained within that event can be used by the dispatcher 50 to determine which window is currently at that position, and hence which application should receive the event. Typically, if the next event has no positional information, for example if it represents a character input via a keyboard, then it will be considered by the dispatcher as being directed to the same application as the previous 'pointing' event, and will be dispatched accordingly.

One major problem with such synchronous systems is that an application can potentially lock up the whole system by incorrect handling of an event. If, for example, the application does not inform the dispatcher that it has processed an event directed to it then the dispatcher will not continue to dispatch any further events that are building up in the queue 40. This could happen, for example, if the application gets into a situation where it cannot complete processing of the event directed to it.

As mentioned earlier, the dispatcher 50 can only deal with the next event on the queue once it has confirmation that the previous event has been processed. This can cause problems since the locations of windows on the display screen can change over time, and any significant processing delays can have the result that, by the time the dispatcher 50 comes to deal with a particular event from a pointing device, then the window currently at that location on the screen may be different to the window that the user had intended the pointing event to be directed to at the time the input was made. Such incorrect handling of an event by the system will, at the very least, be irritating to the user, and indeed in some cases it can cause the application to lock up the whole system as discussed above.

These adverse effects can be mitigated if each piece of application software being used on the synchronous event handling system is provided with its own internal queuing mechanism for those cases in which processing of the event is going to take longer than some predetermined length of time. In such cases, the event can be placed on an internal queue and a response can then be made to the dispatcher 50 to allow the next event to be handled by the dispatcher.

The IBM OS/2 Presentation Manager product is a synchronous event handling system of the above type, and the following articles refer to this product: "IBM OS/2 2.0 Presentation Manager Programming Guide", March 1992, published by QUE, USA; "Why You Need to Multitask in the OS/2 Presentation Manager" by Charles Petzold, PC Magazine, Vol.9, no. 9, 15 May 1990, New York, USA, pages 293–299; and "In Any Event" by Rick Grehan, Byte, Vol.15, no.5, May 1990, St Peterborough, USA. These articles describe how the Presentation Manager (PM) GUI funnels input device events, such as keystrokes or mouse movements, into a single system message queue of the operating system. From here, the messages are dispatched, one by one, to the appropriate application message queue, and the application then forwards each message to the relevant window of that application.

Whilst this helps to prevent an application from locking up the system, it makes the task of developing applications for such synchronous systems rather complicated. It would be much simpler if the application developer could rely on the queuing mechanism provided by the operating system, rather than having to write an internal queuing mechanism specific to the application.

Apart from the above-described synchronous event handling systems, there are also other types of GUI systems (eg. the X Window System supported by the X Consortium and used in many UNIX systems) which place events on one of several queues; such systems will hereinafter be referred to as 'asynchronous' event handling systems. FIG. 2 illustrates the manner in which messages are handled in an asynchronous event handling system. As in the FIG. 1 application the three applications A, B and C are running on the system. However in this type of system every event is passed straight to the dispatcher 50 rather than being placed on a queue first. The dispatcher 50 decides which application the event is being directed to (again with reference to information about the position of the various windows on the display device), and then places the event on a queue that is associated with that application. In the FIG. 2 example there is one queue 60, 62, 64 for each application 10, 20, 30. However it is also possible for such systems to have one queue for each window. Hence, for example, application A could have three queues associated with it.

The advantage of such a system is that there is very little delay between the event taking place and the allocation by the dispatcher of the event to a particular application. Further, since the queues are related to particular applications, a problem in one of the applications will not lock up the entire system; the other applications can still process the events placed on their queues.

One disadvantage with such systems is that the user has to perform extra actions in order for the dispatcher to correctly direct the events to the appropriate application queue. Typically the user will use a mouse to select a particular window, before using subsequent events to actually interact with the application via that window. The dispatcher 50 will take this 'window selection' event as an indication that any subsequent events should be directed to the queue associated with that window, and will then discard that particular event. Hence, in effect, one extra event is needed each time a window is to be selected for subsequent input. This introduces a certain amount of inefficiency into such asynchronous event handling systems.

Another disadvantage of most asynchronous event handling systems is their inability to provide a 'type ahead' facility, this being an important factor for keyboard users. 'Type ahead' is a feature whereby a user may type, perhaps without looking at the screen, ignoring the current window visibility. For example, if an attribute such as underline is set within another window of a word processing application then a user may type the commands to open that window, set the attribute and close that window without regard for when the window appears. Type ahead is one of the reasons why some manufacturers favour a synchronous event handler; it is not normally possible to perform type ahead with an asynchronous architecture, since only the pointing device can change focus.

All current GUI systems can be classified as exhibiting either synchronous or asynchronous event handling. For the above described reasons, neither of these two approaches is particularly satisfactory. In synchronous event handling systems, the system is vulnerable to a badly written application, whilst in asynchronous event handling systems, the user is forced to use the system in a less efficient way, and is generally unable to use a 'type ahead' approach.

Hence it is an object of the present invention to provide a data processing system which exhibits an improved technique for handling event queuing.

Accordingly the present invention provides a data processing system arranged to run a plurality of applications, each application being associated with one or more windows, each window being under the control of a user interface provided by the system, the system comprising: a display means for displaying the windows to a user on a display device; an input means for receiving events entered by a user from a plurality of input devices connectable to the system; a storage device for storing the user events received by the input means in queues for subsequent processing by the applications; a queue control means for creating the queues in the storage device and for directing the user events received by the input means to selected queues in the storage device; the system being characterised in that each input device connected to the input means is categorised as either a pointing device or a non-pointing device, and the queue control means comprises: generation means for creating first and second sets of queues in said storage device, each queue in the first set being associated with a specific one of said windows, and each queue in the second set being associated with a non-pointing device from said plurality of input devices; routing means for directing each event entered via a pointing device to the queue in said first set which is associated with the window identified by that pointing device, and for directing each event entered via a non-pointing device to the queue in the second set which is associated with that non-pointing device; and transfer means for transferring control of queues in said second set between the various windows as requested by the applications with which said windows are associated.

Viewed from a second aspect, the present invention provides a method of operating a data processing system to run a plurality of applications, each application being associated with one or more windows, each window being under the control of a user interface provided by the system, the method comprising the steps of: (A) displaying the windows to a user on a display device; (B) receiving events entered by a user from a plurality of input devices connectable to the system; (C) creating queues within a storage device; (D) directing the user events received to selected queues in the storage device, and storing said events in said queues for subsequent processing by the applications; the method being characterised by the steps of: categorising each input device connected to the system as either a pointing device or a non-pointing device; creating, at step C, first and second sets of queues in said storage device, each queue in the first set being associated with a specific one of said windows, and each queue in the second set being associated with a non-pointing device from said plurality of input devices; at step D, directing each event entered via a pointing device to the queue in said first set which is associated with the window identified by that pointing device, and directing each event entered via a non-pointing device to the queue in the second set which is associated with that non-pointing device; and transferring control of queues in said second set between the various windows as requested by the applications with which said windows are associated.

According to preferred embodiments of the invention, the second set of queues will only include at any instance in time one open queue for each non-pointing device. The transfer means is preferably arranged to transfer a queue in the second set by closing the currently open queue, instructing the generation means to open a new queue, and associating the new queue with the window to which the queue is to be transferred.

In some instances, the window taking ownership of the new open queue will also take ownership of the queue closed by the transfer means. Whether this is in fact done will depend on the type of transfer of control that is taking place. For instance, in some cases, ownership of the old closed queue may remain with the window from which control has been transferred, so that that window can continue to process events sent to it prior to the change of control.

In preferred embodiments, the system further comprises a sub-dispatcher for each window, the sub-dispatcher being arranged to extract in a predetermined order events from the queues associated with the sub-dispatcher's window. In this way, the fact that there may be more than one queue associated with a window is hidden from that window, and so the application developer need not be concerned with providing a mechanism for controlling access to the events on the various queues. In other words the provision of a sub-dispatcher resolves the issue of accessing queues at the system level rather than at the application level.

Preferably window location information is provided to be accessible by the routing means, this information containing current positional details of the various windows displayed on the display device. The routing means is arranged to access this information upon receipt of an event from a pointing device in order to establish which queue in the first set should receive that event.

An enhancement used in preferred embodiments of the present invention involves the use of logical events rather than actual events. With this approach, the events stored by the routing means in the first and second sets of queues are logical events rather than the actual events entered via the specific input devices. The incorporation in the preferred embodiment of logical events allows devices to be changed without specific changes to applications. Any new device is classified as either 'keyboard-like' or 'pointer-like' and the events handled accordingly.

From the above, it is apparent that the present invention uses a hybrid queue to handle user events in a GUI system. The problems of system lockup, extra user effort, and the inability to provide a 'type ahead' facility, are avoided. Input devices are divided into two categories: keyboard-like (or non-pointing) devices where the input contains no positional information; and pointing devices, such as a mouse or stylus, that have positional information attached to each event. For input from pointing devices, a queue is built for each window on the system. For input from keyboard-like devices, the system according to the invention simulates a single queue for each type of keyboard-like device, these queues being transferrable between the various windows of the GUI system. This approach provides a system with type ahead capabilities, whilst the presence of multiple queues prevents lock up by a badly written application.

The present invention will be described further, by way of example only, with reference to a preferred embodiment thereof as illustrated in the accompanying drawings, in which.

Before discussing the preferred embodiment of the present invention in detail, the following overview of a system according to the preferred embodiment will be given. In the following description a 'keyboard-like' device may be considered to be one that sends a stream of character input to the system. As well as actual keyboards other devices may behave like keyboards. For example, a speech recognition device may turn spoken words into sequences of keystrokes.

In the system of the preferred embodiment, a queue is initially assigned to each keyboard-like device connected to the system. For each keyboard-like device, the associated queue handles keystrokes in a FIFO manner. The output from each of these queues will be directed to one particular window at any specified moment in time, but such queues are transferable between the various windows. As with many current systems the window which is receiving input is said to have "focus". Hence, for example, at any moment in time only one window will have keyboard focus and so be able to receive typed input from the keyboard. At the same moment in time another window may have speech focus and so be able to receive spoken input.

In the preferred embodiment, to provide for events from pointing devices that, in contrast to keyboard-like devices, include positional information, a single FIFO queue is provided for each window on the system. The events from each pointing device (eg. a mouse, a stylus, etc) are directed to the queue associated with the window that is identified by the coordinates of the event.

Figure 1:
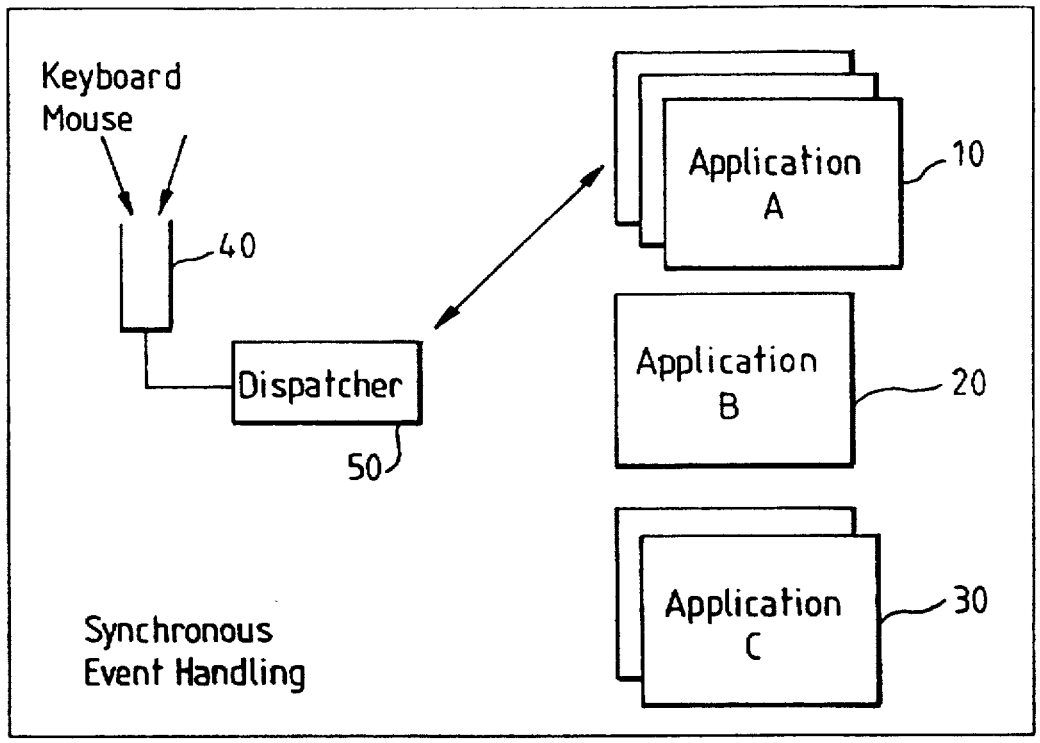
FIG. 1 illustrates how events are handled in a synchronous event handling system according to the prior art.
Figure 2:
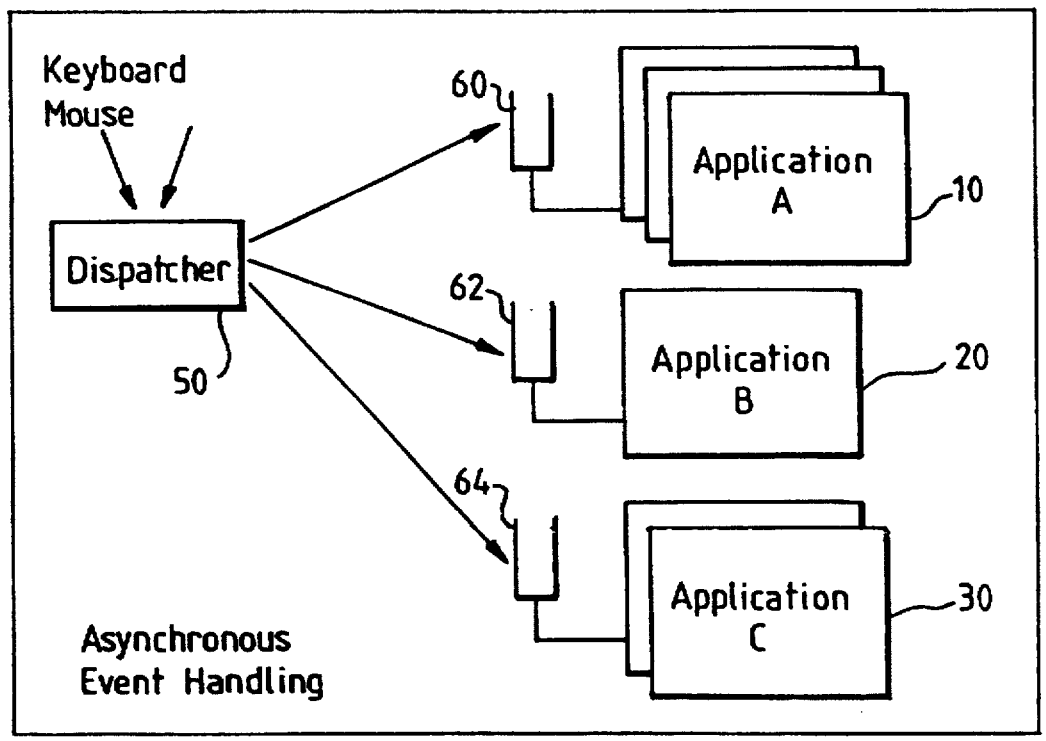
FIG. 2 illustrates how events are handled in an asynchronous event handling system according to the prior art.
Figure 3:
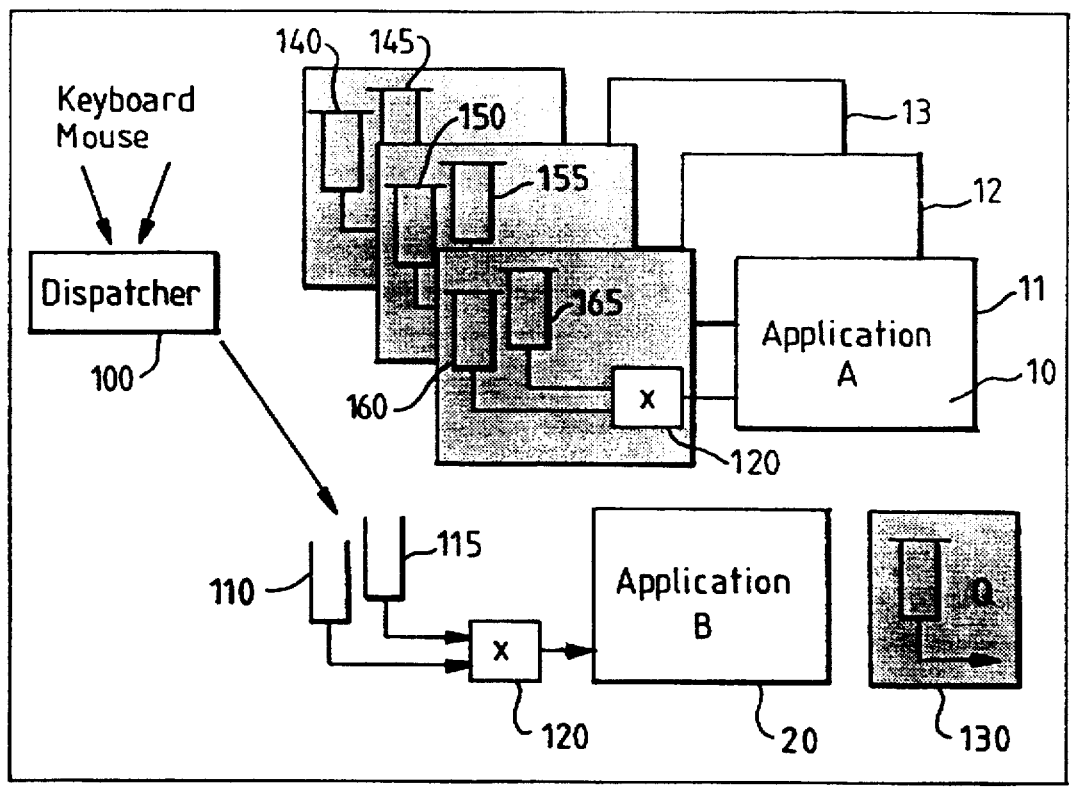
FIG. 3 illustrates how events are handled in a system according to the preferred embodiment of the present invention.

FIG. 3 illustrates the manner in which events are handled in a system according to the preferred embodiment of the invention. As in the prior art examples described with reference to FIGS. 1 and 2, Application A 10 has three windows 11, 12, 13 associated therewith and Application B 20 has one. As with the asynchronous case, every event (irrespective of the originating input device) is passed straight to a dispatcher 100, rather than being placed on a queue first. However the dispatcher 100 in this case decides whether the event has originated from a pointing device or a non-pointing device before deciding where to send the event for processing. If the event has originated from a pointing device, the positional information included in that event is used to determine which window the event was directed to, and the event is then sent to a queue that is established to receive events from pointing devices directed to that window. If on the other hand the event has come from a keyboard-like device, then the event is directed to the queue that is associated with that particular keyboard-like device. As mentioned before this queue can be transferred between the various windows as and when required; the manner in which this is done in the preferred embodiment will be discussed in more detail later.

In the FIG. 3 example, Application B is currently receiving input and the dispatcher 100 is directing input to queues 110 and 115 associated with that application. Queue 110 may, for example, be the queue permanently associated with Application B's window for the storage of events from pointing devices that are directed to that window, whilst queue 115 may be a queue for a keyboard device which is currently associated with Application B's window.

When a queue for a keyboard-like device is transferred, then in the preferred embodiment of the invention, the current queue is closed to prevent any further events from that keyboard-like device being added to it, and a new queue for that keyboard-like device is established. Depending on the situation, ownership of the closed queue may or may not be transferred to the window taking ownership of the new queue. The main thing is that, in any instance, there is only one open queue for any particular keyboard-like device, the dispatcher 100 having access to information identifying the location of such open queues.

With regards to the queues established for pointing devices, these queues are always associated with specific windows and are not transferred between windows. Hence it is not necessary to have only one such queue open at any one time (although in the preferred embodiment the system does only keep one queue open to receive input from pointing devices). Thus Application A and Application B could both simultaneously have queues open to receive input from the mouse, this being a pointing device. However they will not both simultaneously have queues open for the keyboard, since this is a non-pointing device and as such there is a single open queue associated with that device (unlike pointing devices where the open queue(s) is/are associated with specific windows rather than the device).

The closed queues can still be used by the applications with which they are associated, thereby allowing an application to process events directed to it by a particular device before the queue was closed (the queue being closed because, for example, pointing input is redirected to another window, or the focus for a particular non-pointing device was passed to another window). Of course in some cases the application may determine that it has no further use for the contents of a particular closed queue, eg where the user has repeated by accident a command to close an application. To tidy up the storage of the system, a garbage collecting facility can be provided to erase such closed queues after they are no longer of use to the application with which they are associated. Garbage collection is well known in the art, and it is hence not described in any further detail herein.

Returning to FIG. 3, a number of closed queues are shown associated with the windows of Application A. Queues 140, 150 and 160 could, for example, be queues that were established to receive input from pointing devices, ie the mouse in the FIG. 3 example. As mentioned earlier these need not have been closed when the mouse started directing input to Application B's window, but in preferred embodiments they are closed so as to retain conformity in the way that these queues and the queues for each non-pointing device are handled. The queues 145, 155 and 165 could, for example, be formerly open queues for the keyboard device. Only one such keyboard queue would have been open at any one time, and they are all now closed because queue 115 is the current queue for keyboard input. Further ownership of the various closed keyboard queues may be passed around between the windows. For example queue 145 may have been closed when focus for the keyboard was to be passed from window 13 to window 12 of Application A. Queue 155 would then have been created for window 12. However, in addition, window 12 could take ownership of closed queue 145 if it was necessary for window 12 to also process the events placed on that queue. Whether this is in fact done would depend on the type of transfer of control that was taking place.

FIG. 3 also illustrates closed queue Q 130, which is currently not associated with any window. This still has events on it and may subsequently be used by any of the windows of Applications A and B. In the preferred embodiment this may be achieved by a particular window requesting access to that queue, or by one of the other applications passing control of the queue to a particular window.

As is apparent from the above discussion, an application may handle several windows, and as a result of the queuing mechanism of the preferred embodiment, each window may have several queues. It would be very costly if each application had to work out how to handle all these queues. For this reason the system of the preferred embodiment includes means, which shall be referred to herein as a sub-dispatcher, for accessing these queues. The sub-dispatcher is represented by the item X 120 in FIG. 3, and presents the queues to the application as if they were a single queue. A separate sub-dispatcher can be provided for each window or for each application, but in preferred embodiments there is a separate sub-dispatcher for each window. When the next event is requested by a window of an application, all queues attached to that window are scanned and the event with the earliest time stamp attached is presented to the window. However the queues are not amalgamated into a single queue since considerations such as 'type ahead' may mean that a window needs to pass a queue for, for example, a speech input device to another window. This is done by transferring ownership of the speech queue to that other window, whilst events on all other queues remain queued ready for the original window.

As mentioned earlier, it is important that the event goes to the window that was visible at the coordinates of the event at the time the input was made by the user, not to any window that might later be placed there. Many synchronous systems will send output to the wrong window because they resolve the window identity at the time the event is processed, not at the time it is queued. This problem is overcome by the system of the preferred embodiment, since the window identity is resolved immediately, in a similar way to asynchronous systems.

As already discussed, an important factor for keyboard users is 'type ahead'. This is a feature whereby a user may type, perhaps without looking at the screen, ignoring the current window visibility. For example, if an attribute such as underline is set within another window of a word processing application then a user may type the commands to open that window, set the attribute and close that window without regard for when the window appears. Type ahead is one of the reasons why some manufacturers favour a synchronous event handler, it not normally being possible to perform type ahead with an asynchronous architecture. In the preferred embodiment of the present invention, type ahead is possible because any queue associated with a keyboard-like device can be passed to another window when required.

From the above description it is clear that the present invention has advantages over both the prior art synchronous and asynchronous systems.

In preferred embodiments of the present invention, the system uses logical input events in order to improve the flexibility of the system to handle different input devices. Logical events are being used in systems such as IBM's OS/2 and the Apple Macintosh to allow for varied input devices. As will be apparent to those skilled in the art, these systems operate by sending a logical event to the application rather than a physical event. For example, instead of sending a double-click mouse event to the application the default-action logical event is sent. As the default-action can also be signalled by pressing a key on the keyboard, the application can react to the logical event called "default action" rather than both the events of 'double-click' and 'enter'. Also when speech recognition is added then the speech recognizer could send the default-action event rather than the application having to be re-written. The conversion of real, physical, events into logical events is handled by a sub-system included within the dispatcher 100. In this way the real events are replaced by their logical event equivalent before being placed on the queues, and hence before the application receives the events. Further this approach ensures that the conversion is handled uniformly for all applications on the system.

In the above description of the system of the preferred embodiment, the idea of windows receiving 'focus' of particular input devices was discussed. Focus policy is the name normally given to the rules by which input events are directed to applications. As mentioned above, each keyboard-like input device has one focus at a given time. Any event from any input device must be able to alter focus. For example, a mouse may be used to indicate that further keyboard input should be directed to a specific entry field.

In the preferred embodiment of the present invention the window with focus is the owner of the current queue for that device. Whenever focus changes that queue is closed and a new queue created for the newly focused window. As mentioned earlier this prevents one of the annoying features of many synchronous systems whereby input is directed to the wrong window.

If an application decides that one of the events on the queue should start a new application then the queue is passed to that new application. However, focus is not passed to that application unless that queue is still currently active. This prevents the new application from "grabbing focus", another annoying feature of many systems.

There are many different focus policies operated by existing systems. Users will require that they are able to use the policy that they prefer on any new system. The three most popular policies can all be implemented in the system of the preferred embodiment as follows:

FOLLOW THE POINTER:

In this policy the focus is always given to the window under the pointer. This is simply implemented by changing the focus to a new window each time the pointer moves.

CLICK BEFORE:

In this policy the user must first click with the mouse on the window to give it focus. Subsequent events are directed to the new window but the initial click is discarded. This can easily be implemented on this system.

DIRECT USE:

In this policy some subset of the input events is defined to change focus. For example, on OS/2 any use of the Select button on the mouse changes focus. In contrast to the click before policy the event that caused the change is not discarded, but is instead sent to the new focus owner.

It should be noted that the first two of these policies were invented to overcome some of the problems inherent in many asynchronous systems. Neither is optimal for the user but the ability should be retained to avoid retraining costs.

Having provided an overview, the system of the preferred embodiment, and the various processes carried out by the system, will now be discussed in more detail with reference to FIGS. 4 to 6.

Figure 4:
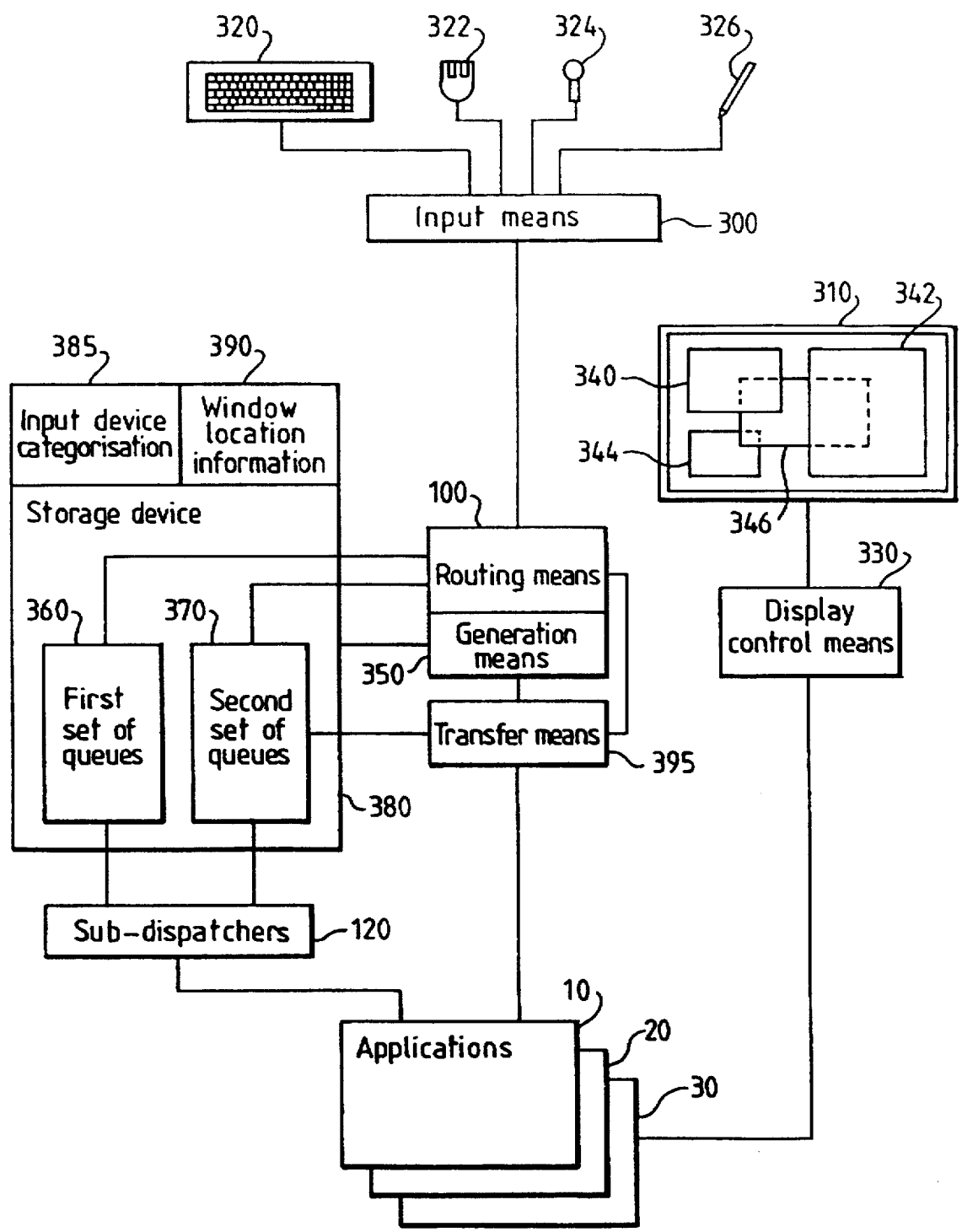
FIG. 4 is a block diagram illustrating a system according to the preferred embodiment of the present invention.

FIG. 4 is a block diagram showing the structure of the system according to the preferred embodiment. The system has an input means 300 arranged to receive events entered by the user using one of a number of input devices that can be connected to the system. In FIG. 3, a keyboard 320, a mouse 322, a microphone 324, and a stylus 326 are illustrated, but it will be apparent that any other suitable input devices could also be connected to the system.

The events entered using the input devices will be directed at one of a number of windows 340, 342, 344, 346 displayed on a display device 310 such as a computer monitor. As will be apparent to those skilled in the art, the display of these windows on the display device 310 can be controlled by any of a number of known display control devices 330, and this need not be discussed any further herein.

As the events are received by the input means 300, they are passed to the routing means of a queue control means, the routing means determining which queues to place the events on. In preferred embodiments the routing means is provided by the dispatcher 100. A generation means 350 within the queue control means will have already created, for example during initialisation of the system, a first 360 and second 370 set of queues in the storage device 380. Each queue in the first set 360 is a queue for receiving pointing input, and as such will be associated with a specific window provided by the applications 10, 20, 30 currently running on the system. Each queue in the second set 370 is associated with a specific non-pointing device.

Given the input devices illustrated in FIG. 4, then the first set 360 would, in the preferred embodiment, include a queue for each window of each application, each of these queues being able to receive input from either of the two pointing devices, namely the mouse 322 and the stylus 326. These queues could remain open all the time, but in the preferred embodiment only the queue for the window that is currently receiving pointing input remains open and the others are closed. When pointing input moves to another window, a new queue is opened associated with that window, and the previously open queue is closed.

The second set of queues 370, on the other hand, will include one open queue for each non-pointing device. Hence there will be an open queue for events entered via the keyboard 320, and an open queue for events entered via the microphone 324. There will typically also be a number of closed queues, since, each time the focus for a particular non-pointing device is passed between windows, one queue is closed and a new one is open. Nevertheless, the second set will only include at any one time one open queue for each non-pointing device.

The storage device 380 may also include a list 385 categorising each input device as either a pointing device or a non-pointing device, and the dispatcher 100 may refer to this when determining whether a particular event has originated from a pointing device or not. As mentioned earlier each event includes information identifying the device that the event originated from, and so this information can be used by the dispatcher in combination with the list 385 to categorise the event as one which should be directed to a queue in the first set 360, or as one which should be directed to a queue in the second set 370. Alternatively the event may include all the necessary information, rendering the list 385 unnecessary.

If the dispatcher determines that the event originates from a non-pointing device then it sends the event to the open queue in the second set 370 that is associated with the particular non-pointing device. If however the event is from a pointing device, the dispatcher consults window location information 390 within the storage device 380 to determine which window the event is directed at. The window location information 390 is an up-to-date record of the location of the windows on the display device 310, and so the dispatcher can assess from the positional information contained in the event which window the event is directed at. Once this determination has taken place, the event is directed to the queue in the first set 360 associated with that window.

When one of the windows of the applications 10, 20, 30 wishes to process the next event directed to it, the sub-dispatcher 120 for that window is used to extract the next event from the various queues currently associated with that window.

If a particular event requires ownership of a queue in the second set 370 to be transferred, a transfer means 395 provided by the system is used. The transfer means 395 closes the currently open queue for the non-pointing device in question, instructs the generation means 350 to create a new one, and connects that new queue through the relevant sub-dispatcher 120 to the window or application which is to take ownership. Further the transfer means 395 informs the dispatcher 100 of the transfer so that the dispatcher can subsequently direct events for that device to the appropriate queue.

Figure 5A:
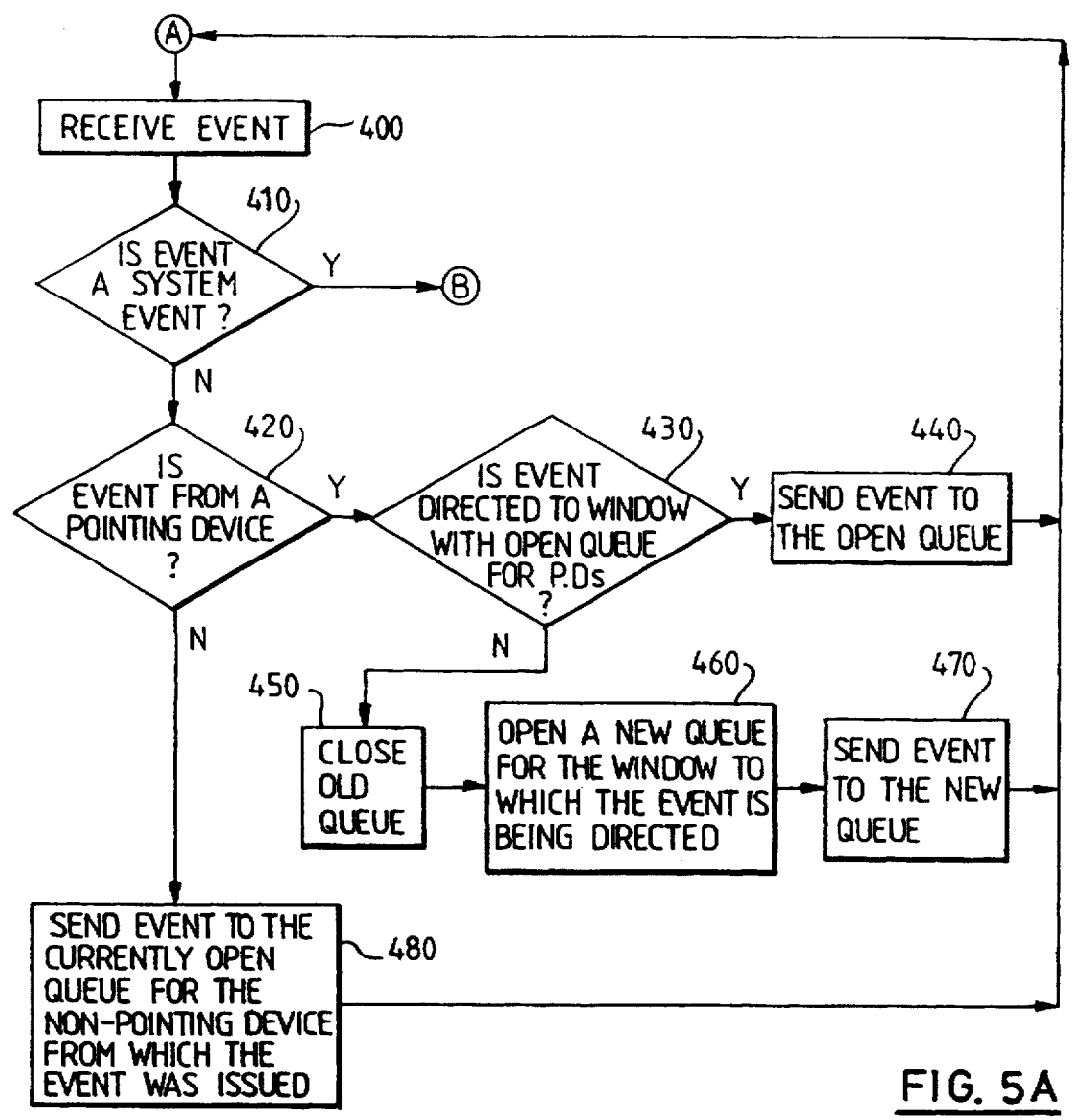
FIGS. 5A and 5B are flow diagrams illustrating how events are received and handled by the dispatcher of the system according to the preferred embodiment.
Figure 6:
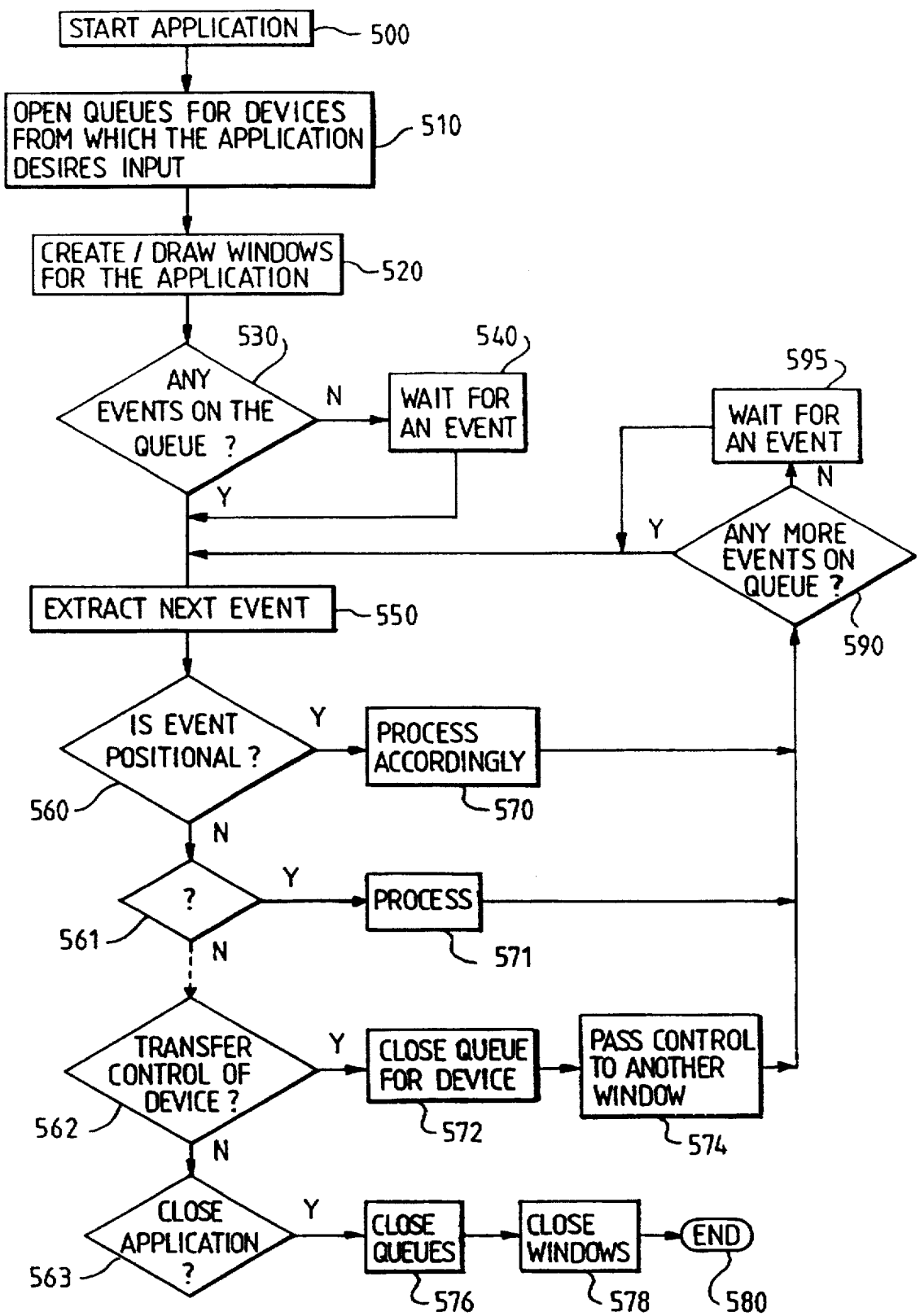
FIG. 6 is a flow diagram illustrating how an application processes events stored on the various queues by the system of the preferred embodiment.

FIG. 5A is a flow diagram illustrating in more detail how events are received and handled by the dispatcher 100. At step 400 an event from an input device is received by the dispatcher 100. At 410 the dispatcher determines whether the event is a special system event that causes a specific chain of events to take place. System events are events which control the whole system, not just a specific application. A system event may be, for example, the pressing of either the CTRL+ESC or CTRL+ALT+DELETE keys on an OS/2 system. These events give control to the system, having the effect that either the system displays a list of currently available windows, or the system is rebooted respectively. The process carried out when a system event is detected at step 410 will be discussed in detail later, but for now it shall be assumed that the event is not a system event.

The process then proceeds to step 420 where it is determined whether the event has originated from a pointing device. Typically the event will include data concerning the device, the positional information of the event (if any), and some parameters (eg. a left mouse button click, a specific character from a keyboard). Hence the dispatcher can extract the necessary information from the event about whether the event has originated from a pointing device or not. If it has then the process moves to step 430, where it is determined whether the event is directed to the window that currently has an open queue to receive input from pointing devices.

As mentioned earlier each window will have a queue associated with it to receive events from pointing devices. However in the preferred embodiments of the present invention only one of these queues is open at any one time, and that is the queue belonging to the window that was last the subject of an event from a pointing device. If the pointing event being handled by the dispatcher is directed to the window that has the open queue then the event is sent to that queue at step 440. The process then returns to step 400 to await receipt of the next event.

If on the other hand, this pointing event is directed to any of the other windows being displayed to the user, then the currently open queue is closed at step 450. The window associated with this closed queue can still process the events that were placed in that queue before it was closed, but no new pointing events will be added to that queue. If in the future, pointing events are again directed to that window then a new queue will be established.

After closing the old queue, a new queue is opened at step 460, and is associated with the window to which the current pointing event is being directed. Then, at step 470, the dispatcher sends this event to the newly opened queue. At this point the process returns to step 400 to await receipt of the next event.

If at step 420 it is determined that the event is not from a pointing device, the process moves to step 480, where the event information is used by the dispatcher to determine which non-pointing device issued the event. The event is then sent to the currently open queue for that particular non-pointing device, and the process returns to step 400 to await receipt of the next event.

Figure 5B:
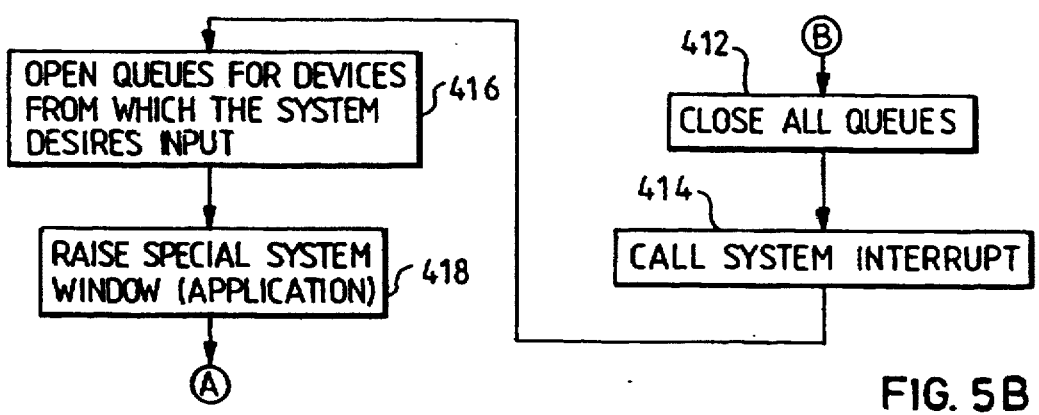

Returning to step 410, if the event is determined to be a system event, then the process moves to step B. The sequence of steps that are carried out in such cases is illustrated in FIG. 5B. Firstly, at step 412, all of the currently opened queues are closed. None of the applications will then be able to receive any further events until the system returns control to them. At step 414, a system interrupt call is made, and at step 416, the system interrupt procedure opens queues for any input devices from which the system desires to receive input. Then at step 418 a special system application is started, and an associated special system window is created. For instance, if the CTRL+ESC system event occurs, a system application called Window List is started which results in a window being created in which a list of all currently available windows is listed.

At this point the process returns to point A in FIG. 5A. Since the system application will now own all the open queues, then it is apparent from FIG. 5A that all subsequent events from pointing and non-pointing devices will be sent by the dispatcher to queues associated with the system application. At some stage, the system application will wish to pass control of certain queues back to one of the applications; for example one of the events may instruct the system application to pass control of the keyboard queue back to application A. This is done by closing the keyboard queue associated with the system application and opening a new keyboard queue associated with Application A. Any subsequent keyboard events will then be directed to the new open queue, and so be processed by Application A.

Having discussed how the incoming events are handled by the dispatcher, and thus end up stored on the various queues provided by the system, a discussion of how an application processes these events will now be given. FIG. 6 is a flow diagram illustrating how an application processes the events stored on the various queues associated with that application.

At step 500 an application is started. This results in queues being established by the system for the devices from which the application desires input (step 510). For instance if the application wants to receive keyboard input, it informs the dispatcher that it wishes a keyboard queue to be established. The dispatcher then closes any other open queue for keyboard events, and creates a new queue to be associated with the new application. The queue is marked with details of the owning application or window, and then the dispatcher informs the application that the queue has been established.

At step 520 the window or windows required by the application are created and displayed. At step 530 the application enquires as to whether any events are waiting on the various queues associated with the application. As discussed earlier this enquiry is performed by the sub-dispatcher 120, and if there are any events the one with the earliest date stamp is extracted from the queue and passed to the application (step 550). If there are no events then the sub-dispatcher waits until there is an event (step 540), and then extracts the event and passes it to the application.

At steps 560, 561, 562, 563, . . . , it is determined what the event signifies, and then the appropriate processing is performed at steps 570, 571, 572, 574, 576, 578, . . . respectively. For example, if at step 562 it is determined that the event is signifying that control of a device queue should be transferred to another application, then the process moves to step 572. At step 572, the current queue for the device in question is closed, and then at step 574, another application is informed that it now has control of the queue for that device. At the same time a new queue for that device is established by the dispatcher 100 and is associated with the application that now has control. After the processing has taken place, the dispatcher determines whether there are any more events on the queue (step 590), and if so the next event is extracted from the queue at step 550. Otherwise the dispatcher waits At step 595 for another event, and then extracts that event at step 550. The process then repeats itself from step 550.

One other possible outcome is also worth noting. The event may signify that the application should be closed. If so, this will be determined at step 563, and all queues associated with the application will then be closed at step 576. Next the windows of the application will be closed (step 578), and the application will then end (step 580).

As will be apparent from the above description, the technique used in the preferred embodiment of the present invention allows for the true multitasking nature of an operating system to be used in a GUI system without the disadvantage of the loss of type ahead capability or the need for additional user effort. This solution is better than either the synchronous or asynchronous prior art approaches, since using a hybrid queue preserves the best elements of the two existing models but also avoids the disadvantages of each.

I claim:

1. A data processing system arranged to run a plurality of applications (10, 20, 30), each application being associated with one or more windows, each window being under the control of a user interface provided by the system, the system comprising:

- a display means (330) for displaying the windows to a user on a display device (310);
- an input means (300) for receiving events entered by a user from a plurality of input devices (320, 322, 324, 326) connectable to the system;
- a storage device (380) for storing the user events received by the input means (300) in queues for subsequent processing by the applications;
- a queue control means for creating the queues in the storage device (380) and for directing the user events received by the input means (300) to selected queues in the storage device (380);
- the system being characterised in that each input device connected to the input means is categorised as either a pointing device (322, 326) or a non-pointing device (320, 324), and the queue control means comprises:
- generation means (350) for creating first (360) and second (370) sets of queues in said storage device, each queue in the first set (360) being associated with a specific one of said windows, and each queue in the second set (370) being associated with a non-pointing device from said plurality of input devices;
- routing means (100) for directing each event entered via a pointing device (322, 326) to the queue in said first set (360) which is associated with the window identified by that pointing device, and for directing each event entered via a non-pointing device (320, 324) to the queue in the second set (370) which is associated with that non-pointing device; and
- transfer means (395) for transferring control of queues in said second set (370) between the various windows as requested by the applications with which said windows are associated.

2. A system as claimed in claim 1, wherein the second set of queues (370) includes at any instance in time only one open queue for each non-pointing device.

3. A system as claimed in claim 2, wherein the transfer means (395) is arranged to transfer a queue in the second set (370) by closing the currently open queue, instructing the generation means (350) to open a new queue, and associating the new queue with the window to which the queue is to be transferred.

4. A system as claimed in claim 3, wherein the window taking ownership of the new open queue also takes ownership of the queue closed by the transfer means (395).

5. A system as claimed in any preceding claim, further comprising a sub-dispatcher (120) for each window, the sub-dispatcher being arranged to extract in a predetermined order events from the queues associated with the sub-dispatcher's window, the fact that there may be more than one queue associated with a window thereby being hidden from that window.

6. A system as claimed in any preceding claim, further comprising window location information (390) accessible by the routing means (100) and containing current positional details of the various windows displayed on the display device (310), the routing means (100) being arranged to access this information upon receipt of an event from a pointing device in order to establish which queue in the first set (360) should receive that event.

7. A system as claimed in any preceding claim, wherein the events stored by the routing means (100) in the first (360) and second (370) sets of queues are logical events rather than the actual events entered via the specific input devices (320, 322, 324, 326).

8. A method of operating a data processing system to run a plurality of applications (10, 20, 30), each application being associated with one or more windows, each window being under the control of a user interface provided by the system, the method comprising the steps of:

A) displaying the windows to a user on a display device (310);

B) receiving events entered by a user from a plurality of input devices (320, 322, 324, 326) connectable to the system;

C) creating queues within a storage device (380);

D) directing the user events received to selected queues in the storage device (380), and storing said events in said queues for subsequent processing by the applications;

the method being characterised by the steps of:
- categorising each input device connected to the system as either a pointing device (322, 326) or a non-pointing device (320, 324);
- creating, at step C, first (360) and second (370) sets of queues in said storage device, each queue in the first set (360) being associated with a specific one of said windows, and each queue in the second set (370) being associated with a non-pointing device from said plurality of input devices;
- at step D, directing each event entered via a pointing device (322, 326) to the queue in said first set (360) which is associated with the window identified by that pointing device, and directing each event entered via a non-pointing device (320, 324) to the queue in the second set (370) which is associated with that non-pointing device; and
- transferring control of queues in said second set (370) between the various windows as requested by the applications with which said windows are associated.

9. A method as claimed in claim 8, wherein the second set of queues (370) includes at any instance in time only one open queue for each non-pointing device.

10. A method as claimed in claim 9, wherein the step of transferring control of a queue in the second set comprises the steps of:

closing the currently open queue;
opening a new queue; and
associating the new queue with the window to which the queue is to be transferred.

11. A method as claimed in claim 10, wherein the window taking ownership of the new open queue also takes ownership of the queue closed during the transferring step.

12. A method as claimed in any of claims 8 to 11, further comprising the steps of employing a sub-dispatcher (120) to extract in a predetermined order events from the queues associated with the sub-dispatcher's window, the fact that there may be more than one queue associated with a window thereby being hidden from that window.

13. A method as claimed in any of claim 8 to 12, further comprising the steps of providing window location information (390) containing current positional details of the various windows displayed on the display device (310), this information being accessed at said step D upon receipt of an event from a pointing device in order to establish which queue in the first set (360) should receive that event.

14. A method as claimed in any of claims 8 to 13, wherein the events stored in the first (360) and second (370) sets of queues are logical events rather than the actual events entered via the specific input devices (320, 322, 324, 326).

* * * * *